(12) United States Patent
Lee (10) Patent No.: US 9,998,252 B2
(45) Date of Patent: Jun. 12, 2018

(54) APPARATUS AND MANUFACTURING METHOD FOR AN INTEGRATED MULTICAST SWITCH, FOR USE IN RECONFIGURABLE OPTICAL ADD-DROP NETWORKS

(71) Applicant: DiCon Fiberoptics, Inc., Richmond, CA (US)

(72) Inventor: Ho-Shang Lee, El Sobrante, CA (US)

(73) Assignee: DICON FIBEROPTICS, INC., Richmond, CA (US)

( * ) Notice: Subject to any disclaimer, the term of this patent is extended or adjusted under 35 U.S.C. 154(b) by 288 days.

(21) Appl. No.: 14/497,032

(22) Filed: Sep. 25, 2014

(65) Prior Publication Data

US 2015/0244492 A1 Aug. 27, 2015

Related U.S. Application Data (60) Provisional application No. 61/943,092, filed on Feb. 21, 2014.

(51) Int. Cl.
*H04J 14/00* (2006.01)
*H04J 14/02* (2006.01)
(Continued)

(52) U.S. Cl.
CPC ........ *H04J 14/0212* (2013.01); *G02B 6/3546* (2013.01); *H04Q 11/0005* (2013.01); *G02B 6/30* (2013.01); *G02B 6/3512* (2013.01); *G02B 6/3636* (2013.01); *G02B 2006/1215* (2013.01); *H04Q 2011/003* (2013.01); *H04Q 2011/0015* (2013.01); *H04Q 2011/0035* (2013.01); *H04Q 2011/0047* (2013.01)

(58) Field of Classification Search
CPC .......... G02B 6/3546; G02B 2006/1215; G02B 6/30; G02B 6/3515; G02B 6/3636; H04J 14/0212; H04Q 2011/003; H04Q 11/005; H04Q 2011/0015; H04Q 2011/0035; H04Q 2011/0047
USPC .................................. 398/45–57; 385/14–18
See application file for complete search history.

(56) References Cited

U.S. PATENT DOCUMENTS

| | | | |
|---|---|---|---|
| 6,381,051 B1 * | 4/2002 | Polinsky | G02B 6/29364 359/589 |
| 6,628,856 B1 | 9/2003 | Costello et al. | |

(Continued)

*Primary Examiner* — Amritbir Sandhu
(74) *Attorney, Agent, or Firm* — Vierra Magen Marcus LLP (57) ABSTRACT

In one embodiment, each of the output/input ports of each one of a plurality of optical splitters is connected to one of a plurality of optical switches by means of optical fibers without any fusion splicing in a majority of the optical fibers, and each of the input/output ports of each one of the switches is connected to one of the optical splitters by means of the optical fibers without any fusion splicing in a majority of the optical fibers. Each of the output/input ports of each one of the optical splitters may be directly connected to the ferrule and one of the input/output ports of one of the switches by the optical fibers. The optical splitters may be implemented in at least one planar lightwave circuit (PLC) chip. Optionally, at least one fiber holder defining a plurality of channels therein may be used to hold the optical fibers each of which is aligned with a corresponding output/input port of one of the optical splitters.

20 Claims, 8 Drawing Sheets

(51) Int. Cl.
*H04Q 11/00* (2006.01)
*G02B 6/30* (2006.01)
*G02B 6/35* (2006.01)
*G02B 6/36* (2006.01)
*G02B 6/12* (2006.01)

(56) References Cited

U.S. PATENT DOCUMENTS

| | | | | |
|---|---|---|---|---|
| 8,891,914 B2* | 11/2014 | Ticknor | ............... | G02B 6/35 385/17 |
| 9,883,263 B2* | 1/2018 | Colbourne | ........ | H04Q 11/0005 |
| 2003/0007725 A1* | 1/2003 | Fuke | ............... | G02B 6/29376 385/27 |
| 2003/0039443 A1* | 2/2003 | Catchmark | ........... | B82Y 20/00 385/37 |
| 2004/0156585 A1* | 8/2004 | Matusick | ............ | G02B 6/2552 385/33 |
| 2005/0185878 A1* | 8/2005 | Doerr | ................ | G02B 6/12011 385/14 |
| 2006/0193560 A1* | 8/2006 | Yang | ............... | G02B 6/30 385/49 |
| 2008/0085119 A1* | 4/2008 | Ye | .................. | G02B 6/2706 398/85 |
| 2010/0129082 A1* | 5/2010 | Zhong | ............... | H04J 14/0204 398/83 |
| 2010/0266235 A1* | 10/2010 | Lin | ................ | G02B 6/125 385/14 |
| 2010/0272385 A1* | 10/2010 | Akiyama | ............... | G02B 6/125 385/14 |
| 2010/0301352 A1* | 12/2010 | Strandjord | .......... | G01C 19/722 257/84 |
| 2011/0103746 A1* | 5/2011 | Shacklette | ............. | G02B 6/138 385/60 |
| 2011/0104388 A1* | 5/2011 | Shacklette | ............. | G02B 6/138 427/510 |
| 2013/0108215 A1* | 5/2013 | Ticknor | ............... | G02B 6/35 385/17 |
| 2013/0202297 A1* | 8/2013 | Martinelli | ........... | G02B 6/3512 398/49 |
| 2014/0161454 A1* | 6/2014 | Roorda | ............... | H04J 14/0212 398/68 |
| 2014/0254982 A1* | 9/2014 | Frisken | ............... | G02B 6/3518 385/17 |
| 2014/0270760 A1* | 9/2014 | Xu | .................... | H04Q 11/0005 398/45 |
| 2015/0180603 A1* | 6/2015 | Darling | ............... | H04J 14/0212 398/49 |
| 2015/0244492 A1* | 8/2015 | Lee | ................... | G02B 6/3546 398/48 |
| 2016/0291255 A1* | 10/2016 | Hu | ................... | G02B 6/3518 |
| 2017/0099531 A1* | 4/2017 | Colbourne | ........ | H04Q 11/0005 |
| 2017/0315300 A1* | 11/2017 | Hu | ................... | G02B 6/3518 |

* cited by examiner

RECONFIGURABLE OPTICAL ADD-DROP MULTIPLEXER (ROADM)
PRIOR ART DEGREE 4 ROADM
FIG. 1

APPARATUS AND MANUFACTURING METHOD FOR AN INTEGRATED MULTICAST SWITCH, FOR USE IN RECONFIGURABLE OPTICAL ADD-DROP NETWORKS

This application claims the benefit of U.S. Provisional Application No. 61/943,092 filed Feb. 21, 2014

BACKGROUND

This invention relates to the apparatus and manufacturing method for a fully integrated multicast switch, intended for use in Reconfigurable Optical Add-Drop Multiplexers (ROADMs), for application in reconfigurable optical communications networks.

Optical communications networks have long made use of multiple wavelengths of light, typically in the infrared region, to carry communications signals. Modern Dense Wavelength Division Multiplexing (DWDM) networks make use of 40, 80, or even larger numbers of different wavelengths, to maximize the capacity of individual fibers. Optical Add-Drop Multiplexers (OADMs) are used to "drop" or "add" specific wavelengths at different network nodes or locations. In fixed OADMs, the wavelengths that are dropped or added at a specific network node are determined by the hardware, in particular by the use of fixed optical filters. In order to allow faster reconfiguration of the dropped and added wavelengths, Reconfigurable Optical Add-Drop Multiplexers (ROADMs) are used.

A wide variety of design approaches have been used for ROADMs, with various advantages and disadvantages, in terms of functionality, performance, and cost. In terms of functionality, it is highly desirable for ROADMs to be "colorless", "directionless", and "contentionless". "Colorless" means that any wavelength can be assigned or designated to any of the add or drop ports of the ROADM. "Directionless" means that if the ROADM is connected to multiple other network nodes, then any of the add or drop ports can be routed to (or from) any of the other nodes. The number of directions that a ROADM supports (in other words, the number of other network nodes that it connects to) is often referred to as the "degree" of the ROADM. "Contentionless" is a somewhat newer concept in ROADM design, and refers to the ability of a ROADM to handle the contention that may occur if add or drop traffic that is directed to/from two different network nodes, is using the same wavelength. A contentionless ROADM requires total flexibility in the assigning of wavelengths to specific add or drop ports.

A variety of optical components or modules are used, or have been used, to implement ROADMs, including Wavelength-Selective Switches (WSS), Optical Cross-Connect Switches, Broadcast-and-Select Switches, Tunable Optical Filters, and Multicast Switches, often in combination. These different building blocks of modern ROADMs have different advantages and disadvantages, in terms of providing colorless, directionless, and contentionless (CDC) functionality, and also differ in terms of a variety of performance parameters (including insertion loss as one key parameter) and cost.

Figure 1:
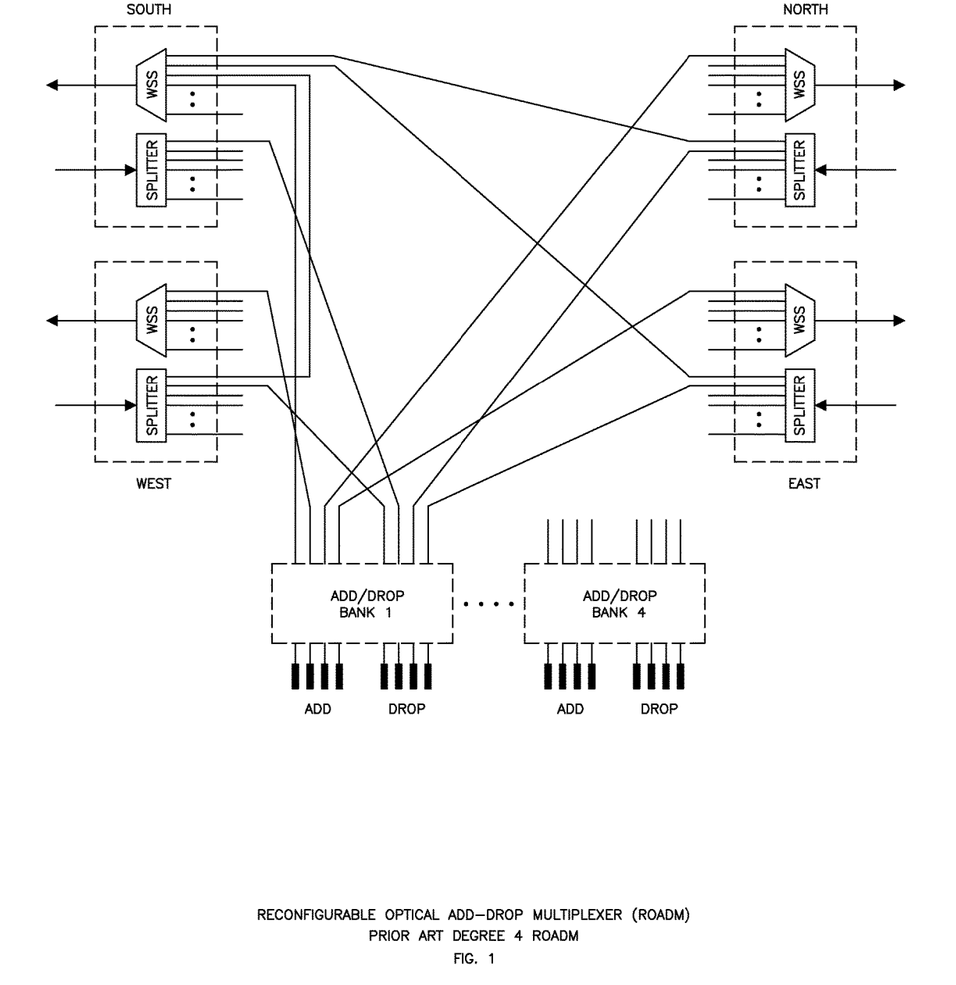
FIG. 1 is a representation of a typical prior art Reconfigurable Optical Add-Drop Multiplexer (ROADM) or network node, depicting its basic functional blocks.

FIG. 1 shows a generalized 4-degree ROADM, supporting traffic from/to four directions (or neighboring network nodes), labeled as North, South, East, and West. The ROADM shown in FIG. 1 comprises all of the functional blocks shown in the figure, including the splitters and Wavelength-Selective Switches (WSS) associated with each of the four directions, as well as the Add/Drop banks. Traffic coming from any of the four directions can be directed to any of the other directions (via an optical fiber path from the splitter of the inbound direction, to the WSS of the outbound direction), or it can be directed to the drop side of one or more add/drop banks. (Note that in FIG. 1, only some of the optical fiber paths are shown.) Traffic from the add side of the add/drop bank(s) can be directed to any of the four directions. In this generalized ROADM, the design of the add/drop bank(s) determines whether the ROADM is colorless, directionless, and contentionless.

Figure 2:
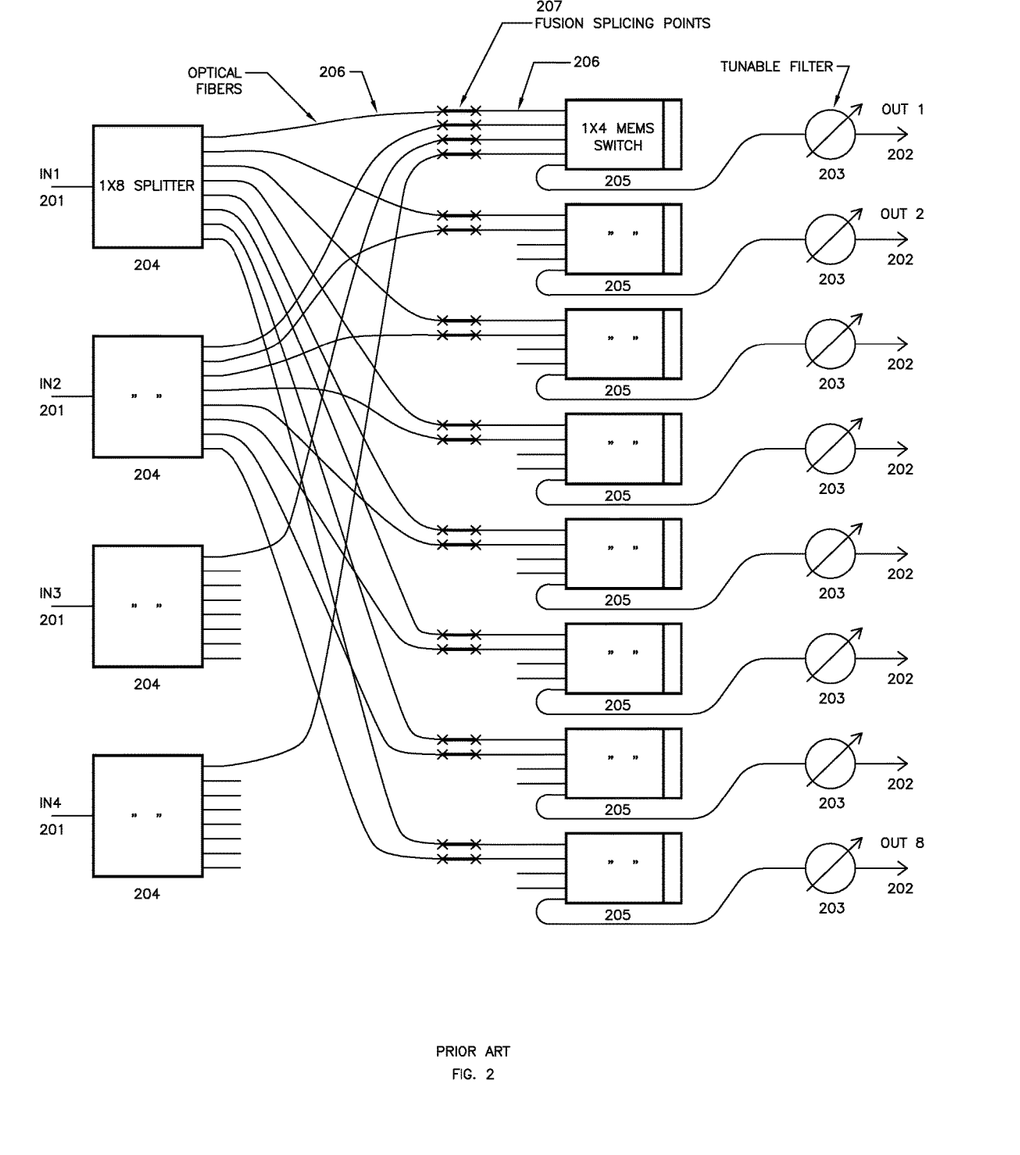
FIG. 2 is a representation of a prior art multicast switch, implemented from individual optical splitter and 1×N optical switch components, and using fusion-splicing techniques to interconnect the individual components.

Multicast switches can be used to implement both the add and drop banks of a ROADM, to implement colorless, directionless, and contentionless functionality. FIG. 2 shows a generalized depiction of a prior art 4×8 multicast switch. More specifically, FIG. 2 shows a multicast switch configured as a drop bank that accepts traffic from four input fibers, IN1 through IN4, (201), representing four degrees, or directions, and directs this traffic to any combination of eight drop ports, labeled as OUT 1 through OUT 8 (202). Since multiple wavelengths may be present on each of the input fibers, tunable optical filters (203) are used at each of the drop ports, to select the specific wavelength that is intended for that drop port. For the purposes of this discussion, the multicast switch includes the four 1×8 splitters (204), and the eight 1×4 (or 4×1) optical switches (205), but does not include the eight associated tunable optical filters (203). One can see that this drop bank design is capable of dropping any wavelength from any one of the four input fibers, at any of the eight drop ports. This includes the ability to direct a given wavelength from one of the inputs, to more than one of the drop ports. This drop bank design is therefore colorless, directionless, and contentionless.

The same 4×8 multicast switch can also be used to implement an add bank that accepts traffic from eight add ports, and directs each of these optical signals to any of the four output fibers. In this case, the tunable filters shown in FIG. 2 are not used, the add ports are the common fibers of the 1×4 optical switches (the fibers shown in FIG. 2 as running between the 1×4 optical switches and the tunable filters), and the optical splitters are providing a multiplexing or combining function, rather than a splitting function. In short, when used as an add bank, the flow of traffic in FIG. 2 is from right to left. Thus, the add ports, labeled as OUT 1 through OUT 8 in FIG. 2, are actually serving as inputs. And the "network side" ports, labeled as IN1 through IN4 in FIG. 2, are actually serving as outputs. Note that traffic from multiple add ports can be directed to the same output fiber. The add bank is therefore colorless and directionless. Whether it is contentionless or not depends on whether the transmitters used at each of the add ports are "tunable" or reconfigurable, to use different wavelengths for their transmitted signal.

In order to provide cost-effective ROADMs that are colorless, directionless, and contentionless, it is important to minimize the cost (and in some cases the physical dimensions) of M×N multicast switches, with M representing the number of input (or output) fibers on the network side, and N representing the number of drop (or add) ports.

In looking at FIG. 2, one can appreciate that as M and/or N increase, the cost, complexity, and size of a multicast switch also increases, where M and N are positive integers, or integers greater than 1. Splitters and 1×N optical switches are commercially available from multiple sources as individual optical components. In many cases, the technology used to implement the splitter function is significantly different from the technology used to implement the optical switching function. It is therefore a typical practice to implement multicast switch modules by integrating or interconnecting individual splitter and optical switch components, using fusion-splicing techniques to connect the fiber pigtails (206) of the separate components. With this approach, the number (and cost) of the splices needed between the individual splitters and switch components increases rapidly, as a function of the product of M and N. For example, a 4×8 multicast switch, as shown in FIG. 2, would require four 1×8 splitter components (204), eight 1×4 optical switches (205), and 32 fusion-splicing operations, with the fusion splicing points labeled as item 207.

SUMMARY

The manufacture of prior art multicast switches has typically required a large number of fusion-splicing operations, to interconnect the fiber pigtails of multiple individual optical components. In many cases, the technology used in the different types of individual optical components and functions is significantly different, which can prevent or hinder efforts to integrate multiple functions into a smaller number of more complex components. The various embodiments of the present invention comprise the apparatus and manufacturing method for a fully integrated multicast switch, intended for use in reconfigurable optical add-drop networks, significantly reducing the cost of interconnecting the individual optical components that are used in the multicast switch. Other benefits of these embodiments include greater reliability, as well as reduced size.

One embodiment is directed to a multicast optical switching device comprising M optical splitters, each having one input/output port and N output/input ports, and thereby designated as an 1×N optical splitter, M and N being integers greater than 1, and N optical switches, each having a ferrule, M input/output ports and one output/input port, and thereby designated as a M×1 optical switch. The embodiment further includes a first and a second set of optical fibers. Each of the fibers in the first set connects one of the N output/input ports of one of the optical splitters to the ferrule and one of the input/output ports of one of the N switches. Each of the N output/input ports of each one of the optical splitters is connected to one of the N switches by means of the optical fibers in the first set without any fusion splicing in a majority of said optical fibers in the first set, and each of the M input/output ports of each one of the switches is connected to one of the M optical splitters by means of the optical fibers in the first set without any fusion splicing in a majority of said optical fibers in the first set. The ferrule of each of the N optical switches houses the M optical fibers in the first set connected to the M input/output ports of such switch and an optical fiber in the second set is connected to the one output/input port of such switch.

Another embodiment is directed to a multicast optical switching device comprising at least one planar lightwave circuit (PLC) chip that contain(s) M optical splitters, each splitter having one input/output port and N output/input ports, and thereby designated as an 1×N optical splitter, M and N being integers greater than 1; and N optical switches, each having M input/output ports and one output/input port and thereby designated as a M×1 optical switch. The embodiment further includes at least one fiber holder defining a plurality of channels therein and a first and a second set of optical fibers. Each of the optical fibers in the first set is held in one of the fiber holder channels and aligned with a corresponding output/input port of one of the optical splitters, each of the optical fibers and the corresponding output/input port defining there between a corresponding optical path. Each of the N output/input ports of each one of the optical splitters is connected to one of the N switches by means of one of the optical fibers in the first set and through the corresponding optical path, without any fusion splicing in a majority of said optical fibers in the first set, and each of the M input/output ports of each one of the switches is connected to one of the M optical splitters by means of the optical fibers in the first set and through the corresponding optical path, without any fusion splicing in a majority of said optical fibers in the first set.

Still another embodiment is directed to a method for making a multicast optical switching device comprising M optical splitters, each having one input/output port and N output/input ports, designated as an 1×N optical splitter, M and N being integers greater than 1; and providing N optical switches, each having a ferrule, M input/output ports and one output/input port, designated as a M×1 optical switch. The method further includes directly connecting each one of the N output/input ports of each one of the optical splitters to the ferrule and one of the input/output ports of one of the N switches by means of an optical fiber in a set of optical fibers, so that each of the N output/input ports of each one of the optical splitters is connected to one of the N switches by means of optical fibers without any fusion splicing in the majority of said optical fibers in the set, and each of the M input/output ports of each one of the switches is connected to one of the M optical splitters without any fusion splicing in the majority of said optical fibers in the set.

Yet another embodiment is directed to a method for making a multicast optical switching device comprising providing at least one planar lightwave circuit (PLC) chip that contains M optical splitters, each splitter having one input/output port and N output/input ports, and thereby designated as an 1×N optical splitter, M and N being integers greater than 1; and providing N optical switches, each having M input/output ports and one output/input port and thereby designated as a M×1 optical switch, and M optical fibers each connected to one of the M input/output ports of such switch. The method further includes providing at least one fiber holder defining a plurality of channels therein; causing each of the optical fibers of the N optical switches to be held in one of the plurality of channels; and aligning each of the optical fibers held in one of the channels with a corresponding output/input port of one of the optical splitters, each of the optical fibers and the output/input port aligned with such optical fiber defining there between a corresponding optical path. Consequently each of the N output/input ports of each one of the optical splitters is connected to one of the N switches by means of an optical fiber and through its corresponding optical path without any fusion splicing in the majority of said optical fibers, and each of the M input/output ports of each one of the switches is connected to one of the M optical splitters by means of an optical fiber and through its corresponding optical path without any fusion splicing in the majority of said optical fibers.

BRIEF DESCRIPTION OF THE DRAWINGS

FIG. 6A03 depicts a cross-sectional view of a portion of item 6A01 of FIG. 6A.

FIG. 6B09 depicts a cross-sectional view of one of the V-grooves of FIG. 6B, with its associated fiber.

DETAILED DESCRIPTIONS OF THE PREFERRED EMBODIMENTS

FIG. 2 illustrates a representative prior art multicast switch, configured with tunable optical filters on its output ports, for use as a drop bank within a Reconfigurable Optical Add-Drop Multiplexer (ROADM). The specific prior art embodiment shown in FIG. 2 incorporates a 4×8 multicast switch, with four input fibers (201), and eight output fibers (202). Although FIG. 2 includes tunable optical filters (203) on each output, these may be considered to be separate from the multicast switch itself.

The 1×8 splitters (204) and 1×4 optical switches (205) that are used to implement a 4×8 multicast switch are available as individual optical components from a variety of commercial suppliers. These individual optical components can be procured with fiber pigtails (206) that have either been connectorized, or are without connectors, for their inputs and outputs. It is therefore typical practice to construct multicast switches as modules, in which the multiple splitters and optical switch components are interconnected via fusion splicing (207) of their fiber pigtails.

Another reason for this modular construction is that the technology choices for splitters may be significantly different from the technology choices for optical switches, making it difficult to combine these functions into a smaller number of components. For example, optical splitters are typically implemented using one of three basic technologies, including thin-film coating technology, fused biconical taper (FBT) technology, or planar lightwave circuit (PLC) technology. Thin-film couplers or splitters, and FBT couplers or splitters, are usually 1-into-2 devices, such that a 1×8 splitter would require the cascading of multiple components. PLC technology offers significant cost advantages for larger fan-out splitters, in that cascaded 1×2 splitters may be implemented on a single PLC chip or substrate, as a single optical component.

Similarly, optical switches may be implemented using a variety of technologies. Some of these optical switch technologies include thermo-optic switches (sometimes using PLC structures), electro-optic switches (also sometimes using PLC structures), and Micro-Electro-Mechanical Systems (MEMS) switches. In the general category of MEMS optical switches, a variety of MEMS structures may be used to provide the switching function, including moving shutters, single-axis tilt-mirrors, and dual-axes tilt mirrors (see U.S. Pat. No. 6,628,856). Depending on the specific type of MEMS technology used, MEMS optical switches can offer the advantage of being able to implement 1×4 optical switches (or larger fan-outs) without requiring cascading of multiple 1×2 switch elements, resulting in lower insertion loss. Because of this insertion loss advantage, as well as other optical performance advantages, MEMS optical switches are an attractive option for use in multicast switches, even if the use of MEMS technology makes it difficult to fully integrate the optical switch functionality with the splitter functionality.

Although not shown in detail in FIG. 2, a typical MEMS 1×N optical switch that uses a MEMS tilt-mirror as its switching mechanism will typically incorporate one or more fiber ferrules, as part of the overall optical switch, where N is a positive integer, or an integer greater than 1. In one embodiment, a single fiber ferrule contains both the input and output optical fibers, and serves to hold them in place, establishing a fixed placement and location for the optical cores of the input and output fibers. The fiber ferrule is then aligned as an entity or sub-assembly, with the MEMS tilt-mirror, typically with a collimating lens (which is also aligned with the ferrule) located between the fiber ferrule and the MEMS tilt-mirror. The input and output fibers emanating from the fiber ferrule may be connectorized, or they may be left as bare fiber pigtail(s), to be fusion-spliced to other optical components. In this prior art design, the fiber ferrule, along with the associated collimating lens and MEMS tilt-mirror, comprise each of the optical switches 205.

In the prior art 4×8 multicast switch embodiment shown in FIG. 2, there are 32 fusion splices required, between the sum total of 32 fiber pigtails emanating from the four 1×8 splitters, and the 32 fiber pigtails emanating from the eight 1×4 MEMS switches. These fusion splicing operations represent a significant component of the labor (and therefore cost) required to manufacture the multicast switch. They also result in the multicast switch needing to be of fairly large physical size, as room must be provided for coiling up the extra length of the spliced fibers into loops, while maintaining the minimum bend radius that is required to avoid excess insertion loss, and other optical impairments. These fiber loops must be carefully routed and held in place, within the outer housing of the multicast switch. The fusion splicing operations, as well as the handling of the resulting fiber loops, can result in fiber breakage or fiber cracking, that in turn may reduce the reliability of the multicast switch.

Figure 3:
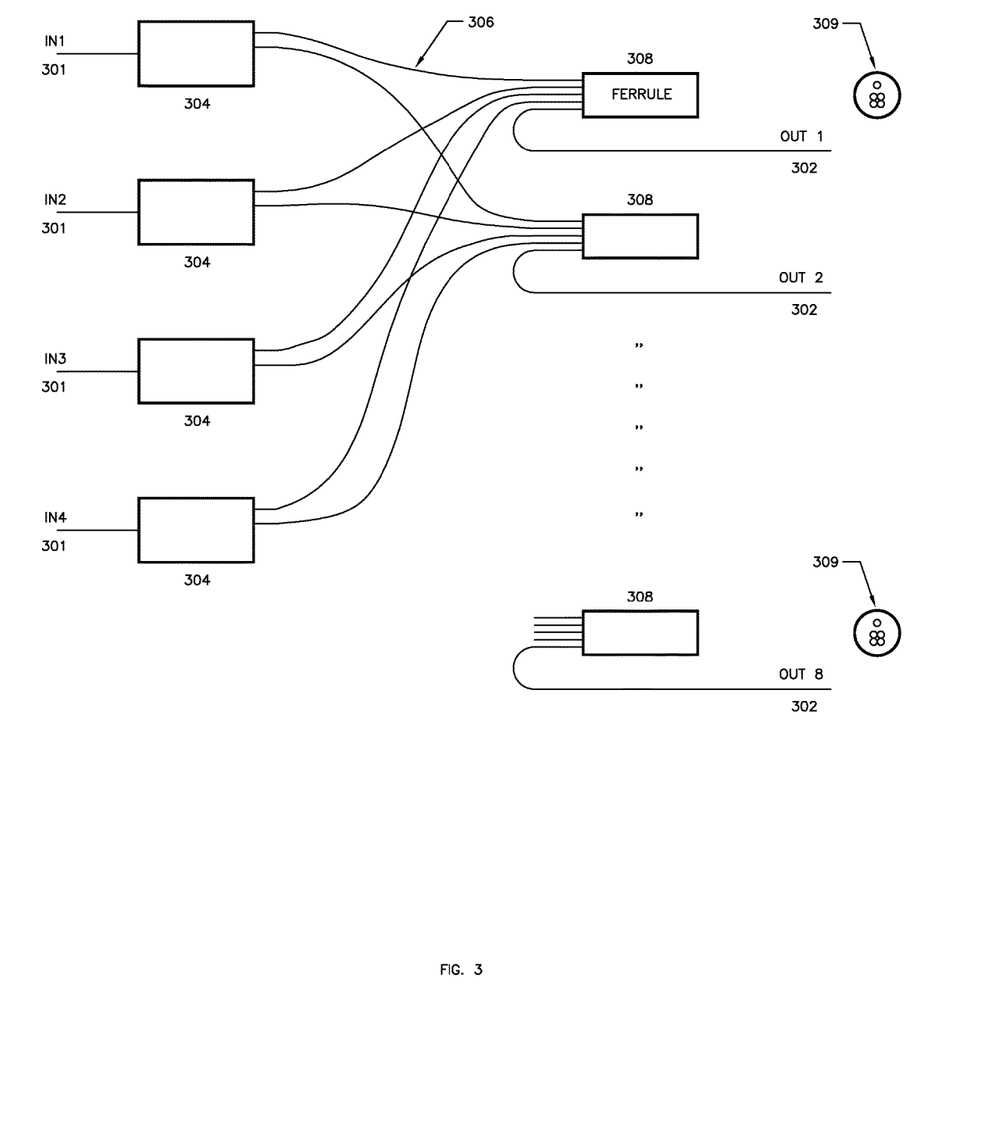
FIG. 3 is a representation of one embodiment of the present invention, illustrating an apparatus and manufacturing method (or process) that integrates optical splitters and fiber ferrules into a sub-assembly.

FIG. 3 shows a representation of a portion of one embodiment of the present invention. In this embodiment, the four input fibers (301) feed into four 1×8 optical splitters (304), each of which has eight output fibers, in the form of bare fiber pigtails (306). Thus, there are a total of 32 fibers emanating from the four splitters. One output fiber from each of the four splitter components, along with one additional fiber, is bonded inside of a ferrule (308). The added fifth fiber will then become the common fiber of a 1×4 optical switch (which may also be thought of as a 4×1 optical switch). This fifth fiber therefore becomes one of the output fibers for the multicast switch.

(For clarity, the four fibers labeled as "inputs" in FIG. 3 would be acting as inputs in a drop bank configuration, but would be acting as outputs in an add bank configuration. For most of the description that follows, a drop bank configuration will be assumed, with inputs on the left of the figure, and outputs on the right, with an implied "signal flow" from left to right. However the reader will understand that in an add bank configuration the signal flow would be from right to left. In this application, to reflect the bidirectional nature of the various embodiments herein, the term "input/output"

when used to characterize a port or optical fiber will indicate a port or optical fiber that acts as an input or input path in a drop bank configuration, with signal flow from left to right, and acts as an output or output path in an add bank configuration, with signal flow from right to left. Similarly, the term "output/input" when used to characterize a port or optical fiber will indicate a port or optical fiber that acts as an output or output path in a drop bank configuration, with signal flow from left to right, and acts as an input or input path in an add bank configuration, with signal flow from right to left. In other words, the first designation, before the/mark, will be relevant for signal flow from left to right, and the second designation, following the/mark, will be relevant for signal flow from right to left.)

Since each of the 1×8 splitter components in FIG. 3 has eight output fibers, and only one of these output fibers is used in a given ferrule, the total number of such ferrules is eight. Thus, the ferrule assembly process results in eight ferrules (308), each of which has a fiber coming from each of the four 1×8 splitters, plus one output fiber. The ferrules may be made of glass, ceramic, metal, or other materials, with one or more bores to hold the input and output fibers of the resulting MEMS optical switches. Each ferrule's end face is then polished with a slight angle, and an Anti-Reflective (AR) coating is applied to the ferrule end faces, to reduce Fresnel back-reflection. The specific fiber placement within each ferrule depends on many variables, including the details of the MEMS tilt-mirror that is used as the switching mechanism. One possible arrangement of the fibers within the ferrule is shown in cross-section as item 309, showing the four fibers that come from the 1×8 splitters as a 2×2 bundle in a common bore, and the output fiber in its own separate bore. One skilled in the design of MEMS optical switches will understand that other ferrule arrangements are possible, including the placement of the output fiber within the same fiber bundle as the four fibers that come from the 1×8 splitters. The combination of the four 1×N splitters, where N is a positive integer, or an integer greater than 1, the eight ferrules, and the fibers that interconnect them, represents a single sub-assembly.

Figure 4:
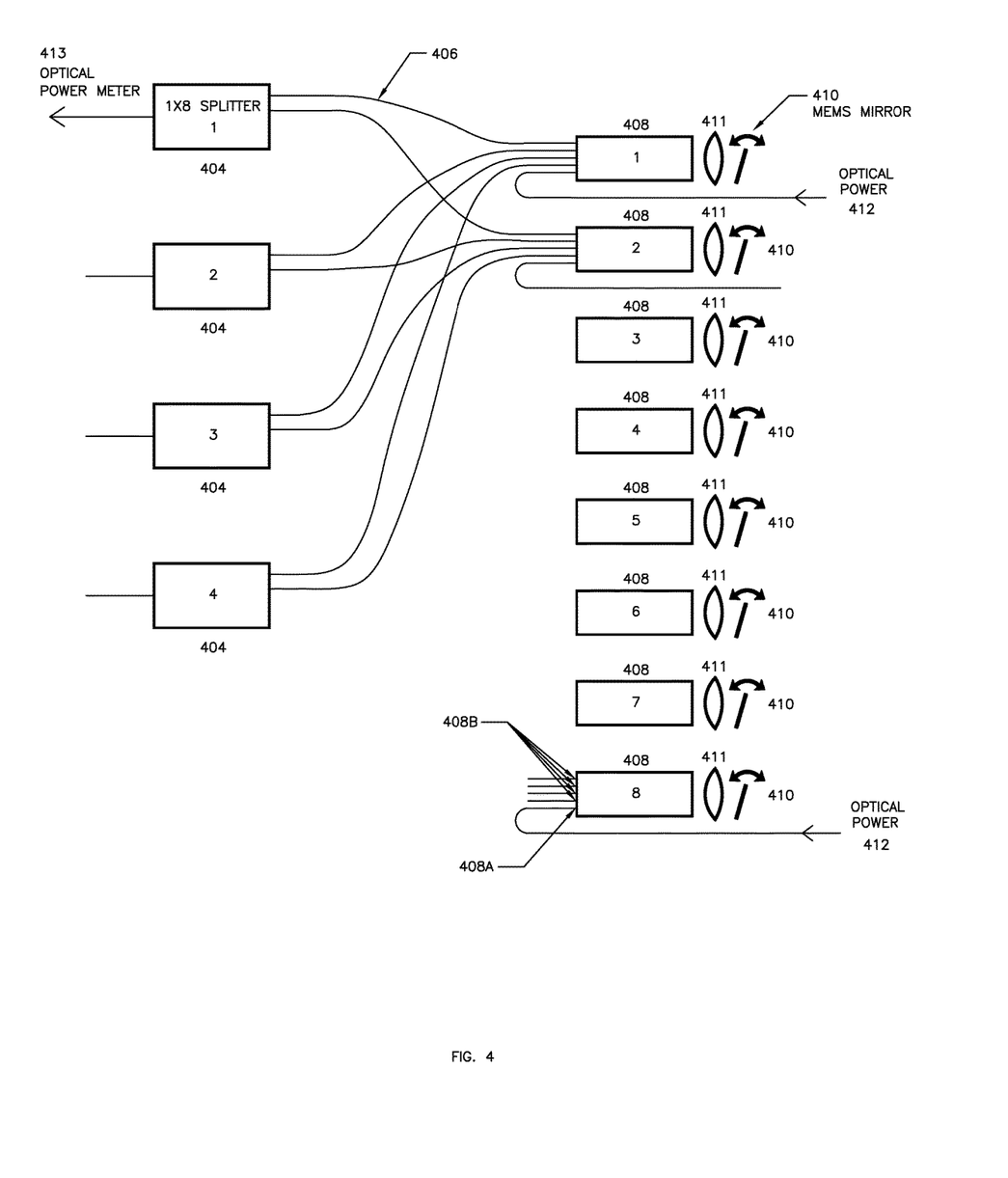
FIG. 4 is a representation of one embodiment of the present invention, illustrating the integration of full optical switch functionality to the sub-assembly of FIG. 3.

Each of the eight fiber ferrules of the sub-assembly are then optically aligned with a MEMS tilt-mirror, to form a complete MEMS optical switch, as shown in FIG. 4. The four 1×8 splitters (404) are interconnected to the eight fiber ferrules (408) as a sub-assembly, as previously shown in FIG. 3. The eight fiber ferrules (408) are then optically aligned and affixed to the MEMS tilt-mirrors (410). Note that in a typical MEMS optical switch construction, a lens (as represented by the items labeled 411) of some type will be located in the optical path between the fiber ferrule and the MEMS tilt mirror. This lens collimates light coming from the fiber ferrule, onto the surface of the MEMS tilt mirror. Light reflected from the MEMS tilt mirror is then focused by the same lens onto the end face of the fiber ferrule. A variety of lens types may be used, including graded index of refraction (GRIN) lenses and cylindrical lenses. Usually, the lens will be affixed to the housing or holder of the MEMS tilt mirror, as a sub-assembly, prior to the alignment of the fiber ferrule. The combination of a fiber ferrule (408), a collimating lens (411), and a MEMS tilt-mirror (410) comprises the 1×N (or N×1) MEMS optical switch. The eight MEMS optical switches shown in FIG. 4 are not functionally complete until the fiber ferrules (408) have been optically aligned and affixed to their respective collimating lenses (411) and MEMS tilt-mirrors (410). The ferrule of each of the N switches is fixed in position relative to the lens of the switch. By controlling a position of the tilt MEMS mirror in each of the optical switches, radiation from any one of the input/output optical fibers carrying input signals to the splitters is transmitted to a selected one of the output/input optical fibers of the switches in a forward direction, and radiation from any one of the output/input optical fibers of the switches is transmitted to a selected one of the input/output optical fibers carrying input signals to the splitters in a reverse direction.

The process of aligning the fiber ferrules to the MEMS tilt mirror and lens sub-assemblies is typically an active alignment process, in which optical signals are used during alignment. In one embodiment of the alignment process, a source of optical power (412), typically a laser that provides a wavelength that is appropriate for the intended use of the multicast switch, is applied in turn to each of the eight output/input fibers that emanate from the output/input ports 408A of the eight fiber ferrules (408). Note that the output/input port 408A and the input/output port(s) 408B, are only labeled and identified for the bottom-most fiber ferrule (ferrule number eight) in FIG. 4. However, these labels and port identifications apply to all of the fiber ferrules (408) in FIG. 4. Using one or more optical power meters (413) at the input/output fibers of the 1×8 splitters, the fiber ferrule of each switch can be aligned to its associated MEMS tilt-mirror and lens sub-assembly, in such a way that the four states of the switch result in the optical power being delivered to the desired input/output fiber. In other words, the optical power (412) is delivered in turn through each of the eight output/input fibers and then through the output/input port 408A to one of the desired input/output ports 408B of the ferrule (408) of one of the 8 switches, where such power is delivered through such port to the desired input/output fiber connecting such port to the output/input port of the desired splitter. The desired input/output port 408B of the ferrule (408) is selected by controlling the position of the movable mirror 410 so that the mirror 410 reflects optical power (412) from the output/input fiber to the desired input/output port 408B of the ferrule. Mirror 410 may be moved by tilting it in a conventional manner, such as by, rotating the mirror, as known to those skilled in the art. Note that the alignment process may be done in the "reverse direction", with an optical signal being applied to the input/output fibers of the 1×8 splitters, and with the optical power meter being applied on the output/input fibers of the switches. Upon completion of the alignment process, the desired switch states will have low insertion loss, and there will be high isolation (i.e., very high insertion loss) on any of the unintended paths through the switches. It may also be useful to define an "OFF" switch state, in which none of the paths through a particular switch are active. Once a satisfactory alignment position of the ferrule for each switch has been determined, the ferrule will be fixed in place, permanently aligning it to its associated MEMS tilt mirror and lens sub-assembly.

One skilled in optical component design will understand that the manufacturing process described above is applicable to a variety of optical switch technologies and configurations, as long as the optical switch elements make use of a fiber ferrule that bundles multiple fibers, in order to optically align them with at least one common fiber. Further, the splitters used can be of any technology, including Planar Lightwave Circuit (PLC) splitters, thin-film splitters, or Fused Biconical Taper (FBT) splitters, as long as the outputs of the splitter components are fibers. In the embodiment of the present invention shown in FIGS. 3 and 4, the splitters can be "off the shelf", commercially-available components, provided with fiber pigtails.

The present invention's method of directly using the splitter output fibers in the construction of the optical switch ferrules, results in the elimination of costly fusion-splicing operations. It reduces the risk of splice breakage, as well as other forms of fiber damage, and also makes the multicast switch more compact, since extra fiber length isn't needed for the fusion-splicing operations. Furthermore, the elimination of the need for fiber looping within the outer housing of the multicast switch also results in significant reductions in the size and physical dimensions of the multicast switch. The embodiment described above, and shown in FIGS. 3 and 4, used the example of a 4×8 multicast switch. However, the apparatus and method of the present invention extend to any M×N multicast switch, with M input fibers, M 1×N splitters, N 1×M (or M×1) optical switches, and N output fibers, where M and N are positive integers, or integers greater than 1. The cost, reliability, and size advantages of the present invention become progressively greater, as M and/or N increase.

Although it is a primary objective of the present invention to avoid the need for fusion splicing, in some situations it may be desirable to allow the possibility of fusion splicing, as a means of repairing a multicast switch. For example, following the completion of the assembly of the multicast switch, subsequent optical testing may reveal a flaw, or some form of performance shortcoming, that is traceable to one or more of the optical splitters, or to one or more of the optical switches. In this case, it may be desirable to repair the multicast switch by replacing the failed or poorly performing splitter or switch component. This could be done by cleaving the fibers that interconnect the failed component to the other components of the multicast switch, and then using fusion splices to connect a replacement component. This technique may be useful for repairing failed components at the time of initial manufacture and test of the multicast switch, as well as the repair of multicast switches that have failed during use "in the field", by customers. In order to allow the possibility of using fusion splicing methods to repair multicast switches, including the replacement of individual optical splitter or optical switch components within the multicast switch, it may be desirable to use relatively long optical fibers (elements 306 and 406) in the construction of the multicast switch. This may reduce some of the space-saving advantages of the present invention, since the longer fibers may need to be looped or coiled within the multicast switch housing. However the cost and reliability advantages of the elimination of fusion splices are preserved, since fusion splicing is being used for repair of the multicast switch, and not as a primary assembly/integration method. After the repair, the multicast switches will contain some optical fibers that contain fusion splices. However, since it is unlikely for a majority of the optical splitters and switches to fail, it is also unlikely for the majority of optical fibers in the set of optical fibers connecting the splitters and switches to contain fusion splices. The multicast optical switching device, where a majority of optical fibers in the set of optical fibers connecting the splitters and switches do not contain fusion splices, is also an embodiment of the invention.

Figure 5:
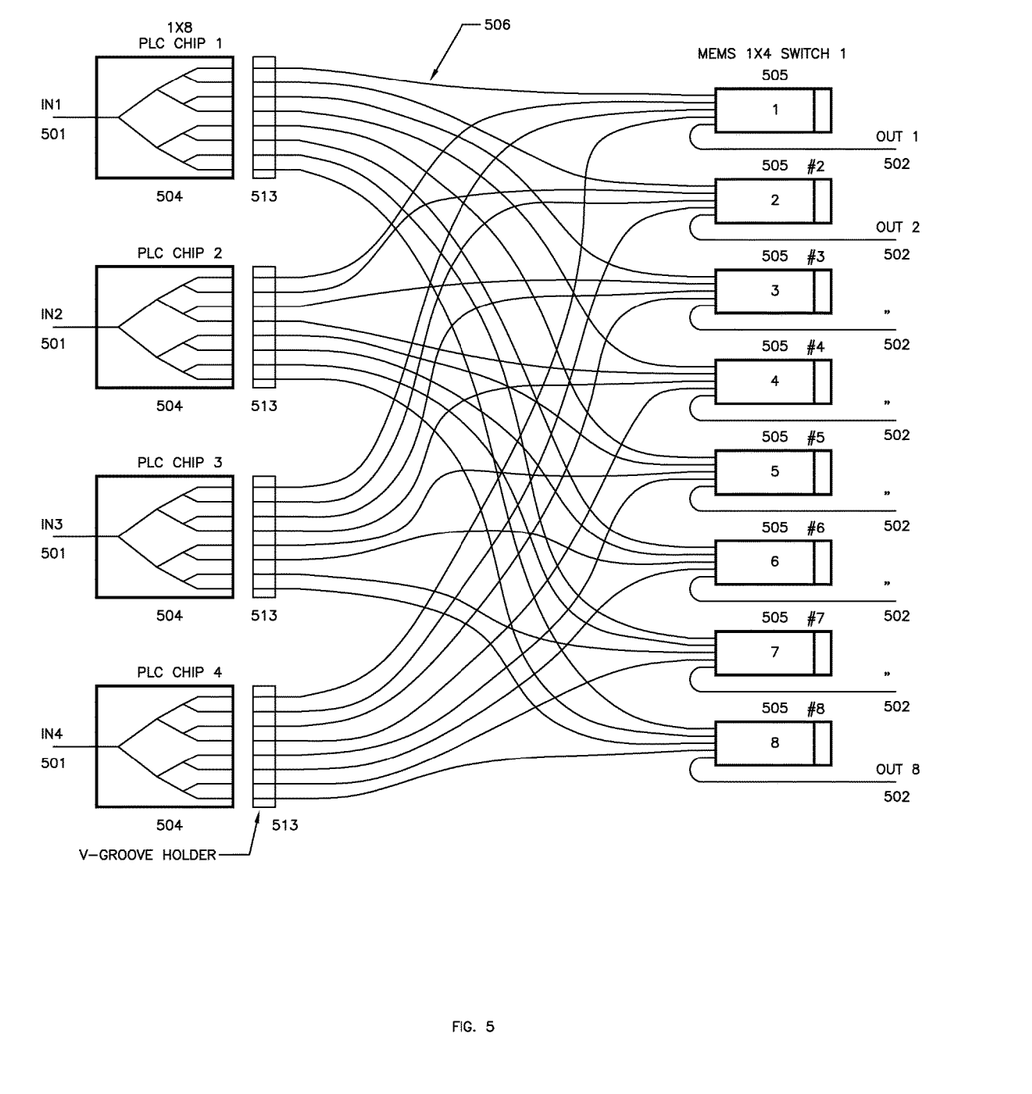
FIG. 5 is a representation of another embodiment of the present invention, in which the fibers from the optical switches are integrated to planar splitter components, using V-grooves to align the fibers.

FIG. 5 shows a representation of another embodiment of the present invention, again based on the example of a 4×8 multicast switch. This embodiment can be thought of as a sort of "reverse approach", when compared to the embodiment shown in FIGS. 3 and 4. Instead of starting with existing 1×8 splitters, and interconnecting their output fibers into a series of ferrules, this additional embodiment starts with existing, already assembled 1×4 (or 4×1) optical switches, and interconnects their input-side fibers into a series of V-groove fiber holders, each V-groove sized and configured for holding an optical fiber. Looking at FIG. 5 from right to left, the eight output fibers (502) come from eight 1×4 (4×1) optical switches, in this case MEMS optical switches. (As with the prior figures, the designations of "input" and "output" fibers in FIG. 5 are based on a drop bank configuration. The signal flow would be from right to left in an add bank configuration. The same terminology used for the embodiment of FIGS. 3 and 4 of "input/output" and "output/input" as applied to ports and optical fibers will be applied to the embodiment of FIG. 5 as well.) There are 32 input-side (i.e. input/output) fibers (506) emanating from the eight 1×4 optical switches. Taking one fiber from each of the eight switches, these eight fibers are fed to or placed into the eight V-grooves of a single V-groove holder (513). Since each of the MEMS switches has four input-side fibers, and only one of these fibers goes to a particular V-groove holder, there are therefore four such V-groove holders. These are associated on a one-to-one basis with four PLC-based 1×8 optical splitter chips or substrates (504), which in turn are connected to the four input fibers (501). The V-grooves are thus examples of channels in the holders 513 for holding optical fibers. As in the embodiment of FIGS. 3 and 4, by controlling a position of the movable MEMS mirror (not shown in FIG. 5) in each of the optical switches 505 in FIG. 5, radiation from any one of the input/output optical fibers carrying input signals to the splitters 504 is transmitted to a selected one of the output/input optical fibers of the switches in a forward direction, and radiation from any one of the output/input optical fibers of the switches is transmitted to a selected one of the input/output optical fibers carrying input signals to the splitters in a reverse direction.

The four V-groove holders (513) are pre-assembled to the input-side fibers (506) that emanate from the eight optical switches (505), as a sub-assembly, thus eliminating the need for fusion-splicing operations. This provides similar cost, reliability and size advantages as the embodiment shown in FIGS. 3 and 4. Also, as with the embodiment shown in FIGS. 3 and 4, the apparatus and method of the present invention, as shown in the embodiment of FIG. 5, apply to any M×N multicast switch, where M and N are positive integers, or integers greater than 1. In the generalized case of an M×N multicast switch, the M input fibers feed M 1×N PLC-based splitters, which in turn feed M V-groove holders, each of which has V-grooves for N fibers. The M×N fibers are fed to N 1×M (M×1) optical switches, which in turn feed N output fibers, where M and N are positive integers, or integers greater than 1. The cost, reliability, and size advantages of the present invention become progressively greater, as M and/or N increase. In the embodiment of the present invention shown in FIG. 5, the optical switches can be "off the shelf", commercially-available components, provided with fiber pigtails. Also note that in the embodiment of FIG. 5, just as in the embodiment of FIGS. 3 and 4, it may be desirable to use longer optical fibers (506) than necessary, just to allow for the possibility of using fusion splicing methods for subsequent repair or replacement of one or more failed optical switch components. Thus, in the same vein as in the discussion of the embodiment of FIGS. 3 and 4, another embodiment is directed to the multicast optical switching device of FIG. 5 modified so that some of the optical fibers contain fusion splices, but where a majority of optical fibers in the set of optical fibers connecting the splitters and switches do not contain fusion splices.

Figure 6A:
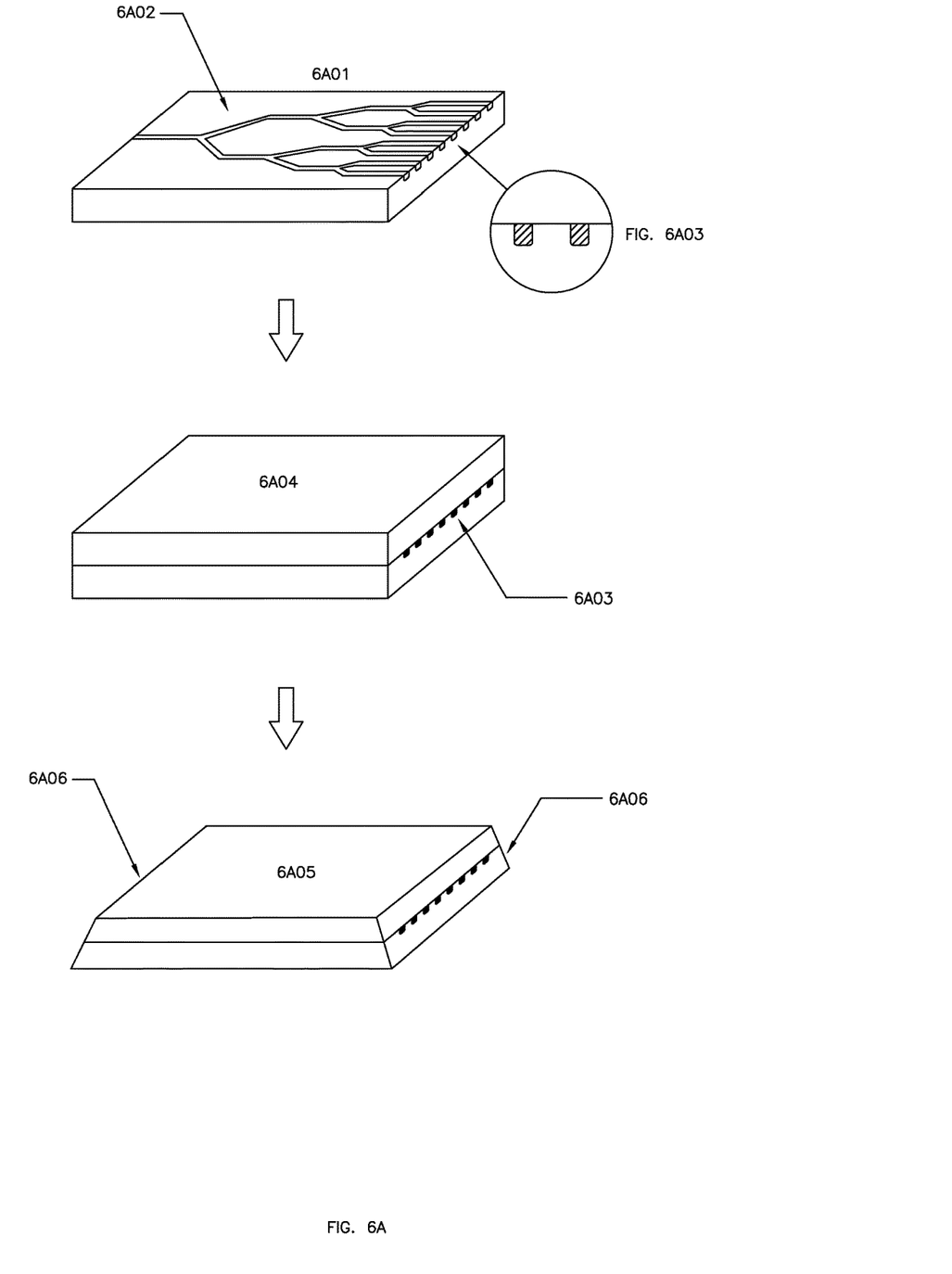
FIGS. 6A, 6B, and 6C show additional details of the manufacturing method (or process) for the embodiment of the present invention that is depicted in FIG. 5.
Figure 6B:
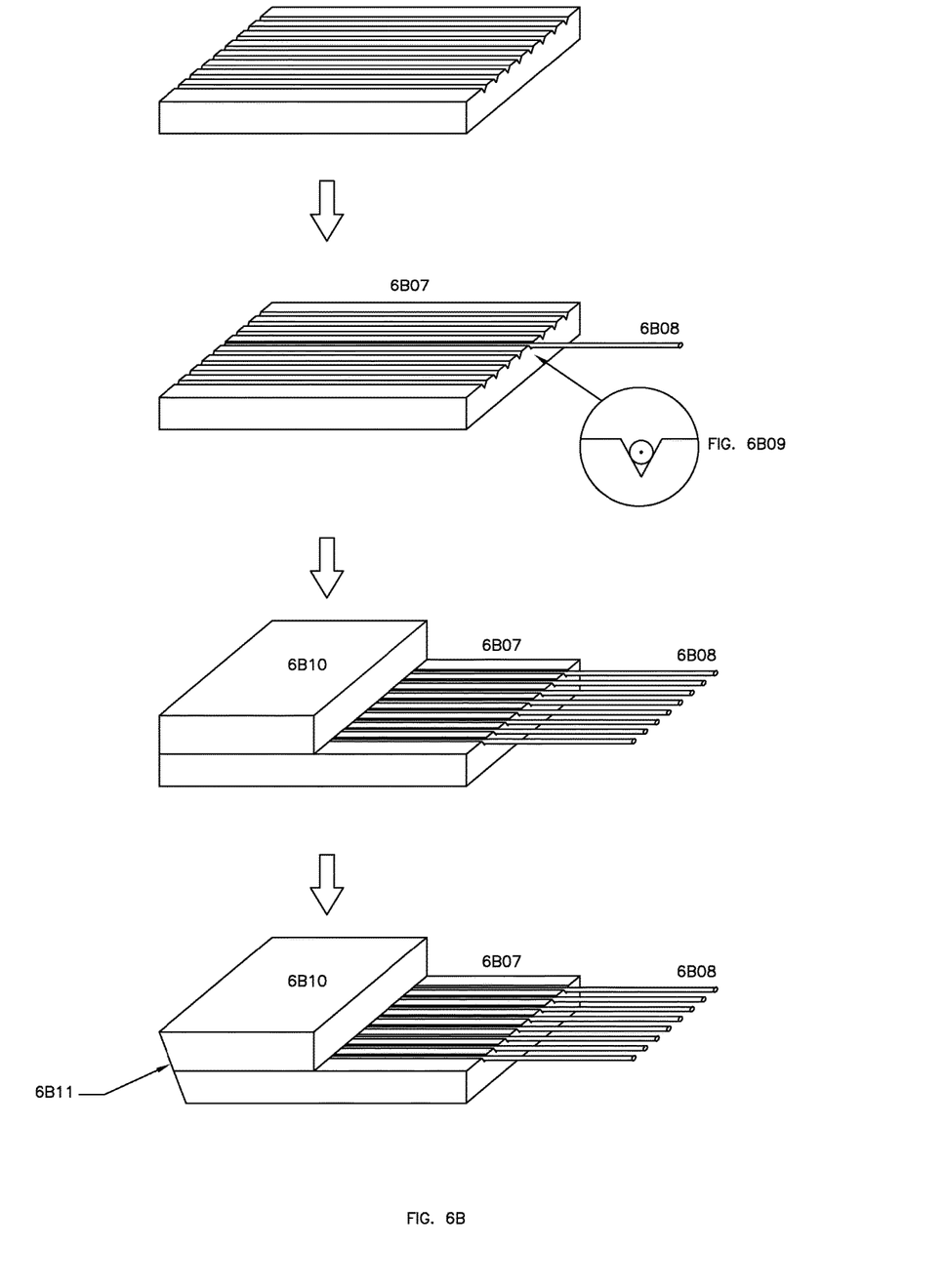
Figure 6C:
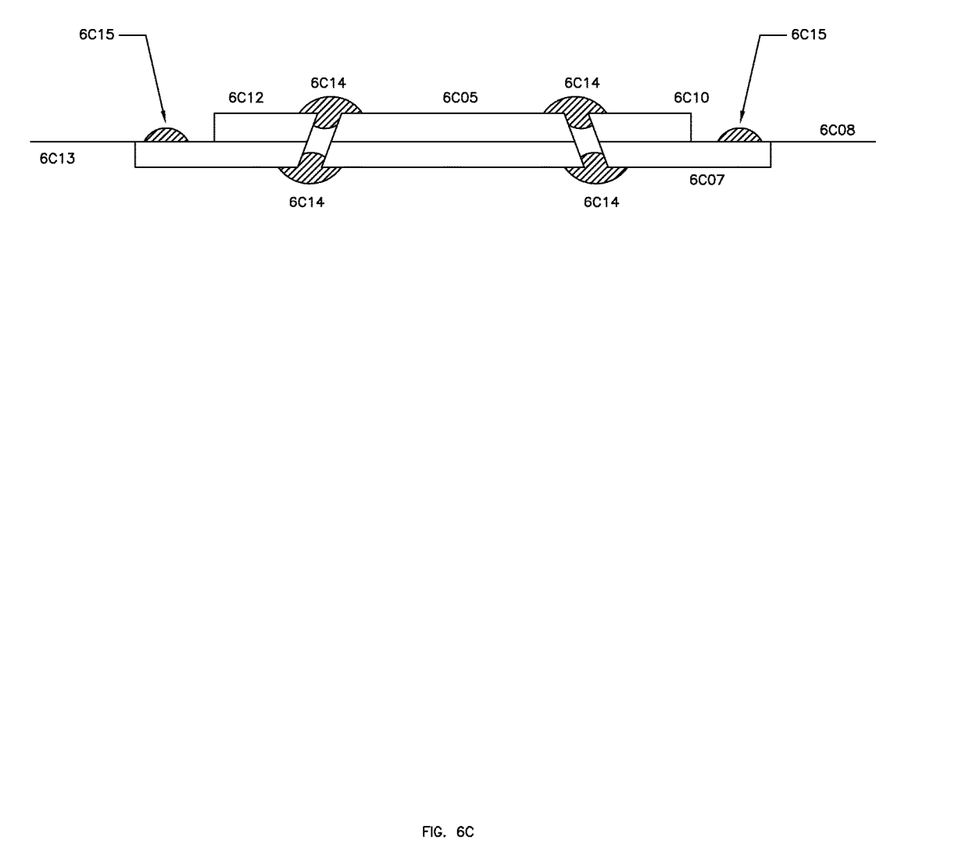

The key manufacturing processes for the embodiment of the present invention shown in FIG. 5 lie in the fabrication of the PLC-based splitter chips or substrates (504), the fabrication of the V-groove holders (513), and the integration of these elements. FIGS. 6A, 6B, and 6C show representative embodiments of these manufacturing processes.

FIG. 6A depicts the basic manufacturing process steps associated with the preparation of the PLC splitters used within the multicast switch. Item 6A01 is a chip or substrate, typically made of silica, or silica-on-silicon. PLC technology typically makes use of wafer-level processing methods, including photolithography and indiffusion of dopants, to define waveguide structures on the surface of the PLC chip or substrate. The waveguide structure (6A02) depicted in FIG. 6A implements a 1×8 splitter, and comprises a cascaded series of 1×2 splitter elements. The waveguide structures are formed by doping a masked wafer (or using other known PLC fabrication processes) to create channels with higher index of refraction, compared to the surrounding material. A representative cross-section view of the waveguides is shown in FIG. 6A03. Note that FIGS. 6A, 6B, and 6C are not drawn to scale. In particular the width and height (depth) of the PLC chip or substrate are greatly exaggerated, in comparison to the length dimension. The apparent size of the wave guide "channels" is also exaggerated. The diameter of the waveguide structures is on the order of 6-10 µm, comparable to the core diameter of typical single-mode optical fibers (e.g. SMF-28 optical fiber, with a core diameter of approximately 9 µm). However the spacing between the waveguide structures at the edge of the substrate, as depicted in FIG. 6A03, is typically 125 µm or greater, to be consistent with the cladding diameter of typical single-mode optical fibers.

The next step in the process is to bond a plain piece of silica (6A04) on top of the PLC splitter chip or substrate, thereby covering the waveguide structures. Then the two ends of the covered chip or substrate (6A05) are polished with angled end-faces (6A06), and coated with a suitable Anti-Reflective (AR) coating, to avoid back-reflection.

FIG. 6B depicts the basic manufacturing process steps associated with the preparation of the V-groove holders used within the multicast switch. The lower substrate or plate (6B07) is typically made of silica, with etched or machined V-shaped grooves. However, other materials are possible. Eight V-shaped grooves are formed on a surface of a substrate 6B07. In FIG. 6B, each of the eight V-grooves is associated with one of the outputs of a 1×8 PLC splitter. Bare, single-mode optical fibers (6B08) are then laid in these V-grooves. As described and shown in FIG. 5, the eight fibers for a particular V-groove holder will comprise one input/output fiber from each of the eight 1×4 MEMS optical switches. Note that this is based on a 4×8 multicast switch, as shown in FIG. 5. A generic M×N multicast switch would require a quantity of M V-groove holders that each have N grooves.

FIG. 6B09 depicts a cross-sectional view of one of the V-grooves, with its associated fiber. This drawing is also not to scale. The circle represents the 125 µm cladding diameter of typical single-mode optical fiber (the 9 µm core is shown as a dot), and the dimensions of the V-groove are preferably suitable to hold the type of fiber used. The depth and width of the V-grooves are preferably very consistent, so that the cores of the fibers are all at the same level, and lie on a straight line. In addition, the spacing between V-grooves, and the "centers" of the V-grooves, are preferably consistent, and also are preferably matched to the spacing between the output-side wave-guide structures of the PLC splitter chips or substrates implementing the output/input ports of the splitter chips, as shown in FIG. 6A. This is to ensure that the cores of the fibers in the V-groove holder will align with waveguide structures of the PLC splitter. In other words, the cores of the fibers in the V-groove holder will align with the output/input ports of the splitters implemented by the waveguide structures of the PLC splitter. Thus, more generally at least some of the output/input ports of the optical splitters are spaced apart by a distance between adjacent output/input ports, and at least some of the V-grooves of the holder are spaced apart by substantially such distance between adjacent V-grooves to achieve proper alignment between the optical fibers in the V-grooves and the output/input ports of the optical splitters.

The next step in the process is to bond a plain piece of silica, or other suitable material (6B10) on top of the V-groove substrate, thereby covering the fibers in the V-grooves. Then the end of the covered chip or substrate is polished with an angled end-face (6B11), and coated with a suitable Anti-Reflective (AR) coating, to avoid back-reflection. Note that the angle of the end-face (6B11) is intended to be identical to, but in the reverse direction, as the angle of the end-face (6A11) of the PLC splitter, as shown in FIG. 6A. FIG. 6B depicts the preparation of an eight-fiber V-groove holder, holding fibers that emanate from the eight MEMS 1×4 switches of the multicast switch shown in FIG. 5. Although not shown, a similar single-fiber V-groove holder is prepared in a similar fashion, to hold the input fiber for each of the PLC splitters.

FIG. 6C shows the assembly or integration of the V-groove fiber holders to the PLC splitter sub-assembly, in side view. Assuming a 4×8 multicast switch, as shown in FIG. 5, item 6C05 is an implementation of one of the four 1×8 PLC splitter sub-assemblies 504, following completion of the preparation steps shown in FIG. 6A. The horizontal line running through the middle of item 6C05 represents the waveguide structures, as seen "on edge", with the single input-side waveguide on the left, and the eight output-side waveguides on the right. Items 6C07 and 6C10 represent the eight-fiber V-groove holder sub-assembly, with eight input/output fibers (6C08) coming from the eight 1×4 MEMS switches, following completion of the preparation steps shown in FIG. 6B. Thus, items 6C07 and 6C10 are one implementation of fiber holder 513 of FIG. 5. Similarly, item 6C12 represents one implementation of the single-fiber V-groove holder sub-assembly, containing one input fiber (6C13).

Using jigs and other mechanical means to align the three sub-assemblies, epoxy or some other form of glue (6C14) is used to bond the three sub-assemblies together, leaving small air-gaps between the mating angle-polished end-faces. FIG. 6C is not drawn to scale. The air-gaps shown in FIG. 6C would be very small, in relation to the thickness of the various elements. As discussed previously, the angled end-faces and use of AR coatings serve to eliminate or reduce back-reflection at the end-face/air interfaces. Epoxy or some other form of glue can also be used to more firmly secure the fibers to the PLC splitter and V-groove holder assembly, as indicated by items 6C15.

Following completion of the manufacturing process steps depicted in FIGS. 6A, 6B, and 6C, the sub-assembly of the multiple PLC splitters and V-groove holders, as well as the interconnected MEMS switches, can all be mounted into a suitable housing. Again using the example of a 4×8 multicast switch, the multicast switch housing would have four input fibers, eight output fibers, and would contain 4 1×8 PLC splitters, their associated V-groove holders, and eight 1×4 MEMS optical switches.

The embodiment described above, and shown in FIGS. 5, 6A, 6B, and 6C, used the example of a 4×8 multicast switch. However, the apparatus and method of the present invention extend to any M×N multicast switch, with M input fibers, M 1×N splitters, N 1×M (or M×1) optical switches, and N output fibers, where M and N are positive integers, or integers greater than 1. The cost, reliability, and size advantages of the present invention become progressively greater, as M and/or N increase.

While a matching number of four PLC-based splitter chips or substrates (504) are used and shown in FIG. 5, it will be understood that a fewer number of PLC-based splitter chips or substrates (504) may suffice. Thus, more than one splitter may be implemented on the same substrate. In fact all four splitters shown in FIG. 5 may be implemented on the same substrate. The switches 505 may be ones available commercially or ones with the construction as described above in reference to FIGS. 3 and 4 using ferrules, lenses and tilt mirrors. As in the embodiment of FIGS. 3 and 4, by controlling the position of the tilt mirror in the switches, radiation passes between the output/input port of the switch and the desired input/output port of the switch 505 in FIG. 5. While tilt mirrors are used in the embodiments, it will be understood that MEMS mirrors moved by translational motion and other types of MEMS-based optical switching mechanisms may be used, such as moving shutters. Non-MEMS optical switches may also be used, as long as the inputs and outputs of the optical switch components are implemented as fiber pigtails. Instead of V-grooves, other types of channels for holding the optical fibers may be used also, such as fiber ferrules with bores for multiple fibers, as long as the optical fibers are held in precise alignment or position, along a straight line. All such and other variations are within the scope of the designs described herein.

While the invention has been described above by reference to various embodiments, it will be understood that changes and modifications may be made without departing from the scope of the invention, which is to be defined only by the appended claims and their equivalents.

The invention claimed is:

1. A multicast optical switching device comprising:
M optical splitters, each having one first port and N second ports, and thereby designated as an 1×N optical splitter, M and N being integers greater than 1;
N optical switches, each having a ferrule, M third ports and one fourth port, and thereby designated as a M×1 optical switch;
a first set of optical fibers, a majority of the optical fibers in the first set directly connecting one of the N second ports of one of the M optical splitters to the ferrule and one of the third ports of one of the N optical switches, wherein the N second ports of each one of the M optical splitters are connected to the N optical switches without any fusion splicing in the majority of the optical fibers in the first set;
a second set of N optical fibers;
the ferrule of each optical switch of the N optical switches housing the M optical fibers in the first set connected to the M third ports of the each optical switch and an optical fiber in the second set connected to the one fourth port of the each optical switch, each of the N optical switches further comprising a lens and a movable micro-electro-mechanical (MEMS) mirror that are aligned with the ferrule of the each optical switch, and
a third set of M optical fibers each connected to the first port of one of the M optical splitters, wherein by controlling a position of the MEMS mirror in each of the N optical switches, radiation from any one of the M optical fibers in the third set is transmitted to a selected one of the optical fibers in the second set in a forward direction, and radiation from any one of the N optical fibers in the second set is transmitted to a selected one of the M optical fibers in the third set in a reverse direction.

2. The device of claim 1, wherein the ferrule of each of the N optical switches is fixed in position relative to the lens of the each optical switch.

3. The device of claim 1, further comprising an anti-reflection coating on an end face of the ferrule of at least one of the N optical switches.

4. The device of claim 1, wherein the M optical splitters are implemented in at least one planar lightwave circuit (PLC) chip, or as thin-film splitters, or Fused Biconical Taper splitters.

5. The device of claim 1, wherein the M optical splitters are commercially-available components, provided with the first set of optical fibers as fiber pigtails of the commercially-available components.

6. A multicast optical switching device comprising:
at least one planar lightwave circuit (PLC) chip that contains M optical splitters, each splitter having one first port and N second ports, and thereby designated as an 1×N optical splitter, M and N being integers greater than 1;
N optical switches, each having M third ports and one fourth port and thereby designated as a M×1 optical switch;
at least one fiber holder defining a plurality of channels therein, the at least one fiber holder separated from the PLC chip by a gap; and
each optical fiber of the plurality of optical fibers being held in one of the plurality of channels and aligned with a corresponding second port of one of the M optical splitters, each optical fiber and the corresponding second port defining there between a corresponding optical path, a majority of the plurality of optical fibers connected to the M third ports of the N optical switches;
wherein the N second ports of each one of the M optical splitters are connected to the N optical switches by means of the plurality of optical fibers and through the corresponding optical paths, without any fusion splicing in the majority of the plurality of optical fibers;
the multicast optical switching device comprising M planar lightwave circuit (PLC) chips and M fiber holders, each of the M PLC chips containing one of the M optical splitters, each of the M fiber holders holding the N optical fibers that are connected to a third port of each of the N optical switches and to the N second ports of a corresponding one of the M optical splitters;
each optical switch of the N optical switches further comprising a lens and movable micro-mechanical systems (MEMS) mirror that are aligned with a ferrule containing the M third ports and the fourth port of the each optical switch;
wherein by controlling a position of the movable MEMS mirror in each of the optical switches, radiation from the second port of a selected one of the M optical splitters is transmitted to the third port of any one of the N optical switches in a forward direction, and radiation from the fourth port of a selected one of the N optical switches is transmitted to the first port of any one of the M optical splitters in a reverse direction, through the plurality of optical fibers.

7. The device of claim 6, wherein each channel of the M fiber holders includes a V-groove for holding an optical fiber.

8. The device of claim 6, each of the PLC chips including a waveguide structure comprising a cascaded series of 1×2 splitter elements.

9. The device of claim 6, wherein each of the M fiber holders is bonded to the corresponding one of the M optical splitters to form a sub-assembly.

10. The device of claim 6, further comprising an anti-reflection coating on an end face of at least one of the M fiber holders and an anti-reflection coating on an end face of the one optical splitter corresponding to the at least one M fiber holder.

11. The device of claim 6, wherein at least some of the second ports of the M optical splitters are spaced apart by a distance in between adjacent second ports, and at least some of the plurality of channels are spaced apart by substantially the distance in between adjacent channels.

12. The device of claim 6, wherein the N optical switches are commercially-available components provided with the plurality of optical fibers as fiber pigtails of the components.

13. The device of claim 6 wherein the ferrule of each of the N optical switches is fixed in position relative to the lens of the each optical switch.

14. A method for making a multicast optical switching device comprising:
    providing at least one planar lightwave circuit (PLC) chip that contains M optical splitters, each splitter having one first port and N second ports, and thereby designated as an 1×N optical splitter, M and N being integers greater than 1;
    providing N optical switches, each having M third ports and one fourth port and thereby designated as a M×1 optical switch, each of the N optical switches previously provided with M optical fibers each fiber of the M optical fibers connected to one of the M third ports of the M×1 optical switch;
    providing at least one fiber holder defining a plurality of channels therein;
    causing each of the M optical fibers of the N optical switches to be held in one of the plurality of channels;
    aligning each of the M optical fibers held in one of the plurality of channels with a corresponding second port of one of the M optical splitters across a gap between the at least one fiber holder and the one optical splitter, each of the M optical fibers and the corresponding second port aligned with one of the M optical fibers defining there between a corresponding optical path;
    wherein the N second ports of each one of the M optical splitters are connected to the N optical switches without any fusion splicing in a majority of the optical fibers; and
    providing each of the N optical switches with a corresponding movable micro-electro-mechanical (MEMS) mirror, and controlling a position of the moveable MEMS mirror corresponding to each one of the N optical switches, so that radiation from any one of the M optical splitters is transmitted to a selected one of the N optical switches in a forward direction, and so that radiation from any one of the switches is transmitted to a selected one of the M optical splitters in a reverse direction.

15. The method of claim 14, wherein the at least one planar lightwave circuit (PLC) chip is made by forming waveguide structures on a surface of a substrate to implement the M optical splitters formed by a cascaded series of 1×2 splitters.

16. The method of claim 14, wherein the at least one fiber holder is made by forming V groove structures on a surface of a substrate to implement the plurality of channels, each of the V groove structures suitable for holding an optical fiber.

17. The method of claim 16, wherein at least some of the second ports of the M optical splitters are spaced apart by a distance in between adjacent-second ports, and at least some of the V groove structures are spaced apart by substantially the distance in between adjacent V groove structures.

18. The method of claim 14, wherein the N optical switches are commercially-available components provided with (M×N) optical fibers as fiber pigtails of said components, and the aligning aligns the optical fibers of the commercially-available components with corresponding second ports of the M optical splitters.

19. A method for making a multicast optical switching device, the method comprising:
    providing M optical splitters, each having one first port and N second ports, designated as an 1×N optical splitter, M and N being integers greater than 1;
    providing N optical switches, each having a ferrule, M third ports and one fourth port, designated as a M×1 optical switch;
    directly connecting one of the N second ports of each one of the M optical splitters to the ferrule and to one of the M third ports of one of the N switches by an optical fiber in a first set of optical fibers, so that each of the N second ports of each one of the M optical splitters is connected to one of the N optical switches by a majority of optical fibers in the first set without any fusion splicing in the majority of the optical fibers in the first set, and each of the M third ports of each one of the switches is connected to one of the M optical splitters without any fusion splicing in the majority of said optical fibers in the first set;
    aligning the ferrule of a plurality of ferules of each of the N optical switches with a corresponding lens and a corresponding movable micro-electro-mechanical systems (MEMS) mirror after the second ports of the M optical splitters are connected to the plurality of ferrules of the N optical switches; and
    controlling a position of the movable MEMS mirror in each of the N optical switches, so that radiation from any one of M optical fibers in a third set is transmitted to a selected one of N optical fibers in a second set in a forward direction, and so that radiation from any one of the N optical fibers in the second set is transmitted to a selected one of the M optical fibers in the third set in a reverse direction.

20. The method of claim 19, wherein the M optical splitters are commercially-available components, provided with the first set of optical fibers as fiber pigtails of the commercially-available components, and said connecting directly connects said fiber pigtails to the ferrules of the N optical switches.

* * * * *